(12) United States Patent
Nakao et al.

(10) Patent No.: US 6,734,813 B2
(45) Date of Patent: May 11, 2004

(54) DATA RECEIVING DEVICE FOR RECEIVING SERIAL DATA ACCORDING TO OVER-SAMPLING

(75) Inventors: Hiroomi Nakao, Tokyo (JP); Takuya Hirade, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/388,743

(22) Filed: Mar. 17, 2003

(65) Prior Publication Data

US 2004/0051652 A1 Mar. 18, 2004

(30) Foreign Application Priority Data

Sep. 17, 2002 (JP) ........................... 2002-270466

(51) Int. Cl.[7] ................................. H03M 9/00
(52) U.S. Cl. ................ 341/100; 341/101; 341/50; 341/102
(58) Field of Search ................ 341/50, 100, 101, 341/102

(56) References Cited

U.S. PATENT DOCUMENTS

| | | | | | |
|---|---|---|---|---|---|
| 5,005,151 A | * | 4/1991 | Kurkowski | .................. | 341/100 |
| 5,777,567 A | * | 7/1998 | Murata et al. | .............. | 341/100 |
| 6,018,305 A | * | 1/2000 | Kikuchi et al. | ............. | 341/100 |
| 6,054,944 A | * | 4/2000 | Yamashita | .................... | 341/95 |
| 6,232,895 B1 | * | 5/2001 | Djupsjobacka et al. | ..... | 341/100 |
| 6,323,787 B1 | * | 11/2001 | Yamashita | .................... | 341/58 |
| 6,642,864 B1 | * | 11/2003 | Djupsjobacka et al. | ..... | 341/100 |

FOREIGN PATENT DOCUMENTS

| JP | 04-261237 | 9/1992 |
|---|---|---|
| JP | 04-329721 | 11/1992 |

* cited by examiner

*Primary Examiner*—Michael Tokar
*Assistant Examiner*—Lam Mai
(74) *Attorney, Agent, or Firm*—Burns, Doane, Swecker & Mathis, L.L.P.

(57) ABSTRACT

Each input binary digit of an input serial bit string having a referential word in a referential word time period is sampled N times to produce a plurality of over-sampled binary digits corresponding to a first group of sampling operations, a second group of sampling operations,--, an N-th group of sampling operations, and the over-sampled binary digits are divided to N divided bit strings corresponding to the N groups of sampling operations respectively. Because each divided bit string having the referential word is correctly sampled at high probability, a word start position of the referential word in each divided bit string is detected, one divided bit string correctly sampled at the highest probability is selected, and a string of words starting from the word start position is retrieved from the selected divided bit string and is output.

8 Claims, 6 Drawing Sheets

DATA RECEIVING DEVICE FOR RECEIVING SERIAL DATA ACCORDING TO OVER-SAMPLING

BACKGROUND OF THE INVENTION

1. Field of the Invention

The present invention relates generally to a serial data receiving device in which an input serial bit string distorted due to noise is correctly received according to an over-sampling method.

2. Description of Related Art

In a case where binary digits are sampled from an input serial bit string received in a conventional serial data receiving device, a level change time (hereinafter called a change point) of each binary digit of the bit string is unknown in the conventional serial data receiving device. Therefore, in a case where a binary digit is undesirably sampled in the neighborhood of its change point, there is a probability that a value of the sampled binary digit is incorrect.

To prevent the occurrence of error in the sampling for the input serial bit string, an over-sampling method has been adopted to correctly perform the sampling of binary digits.

Figure 7:
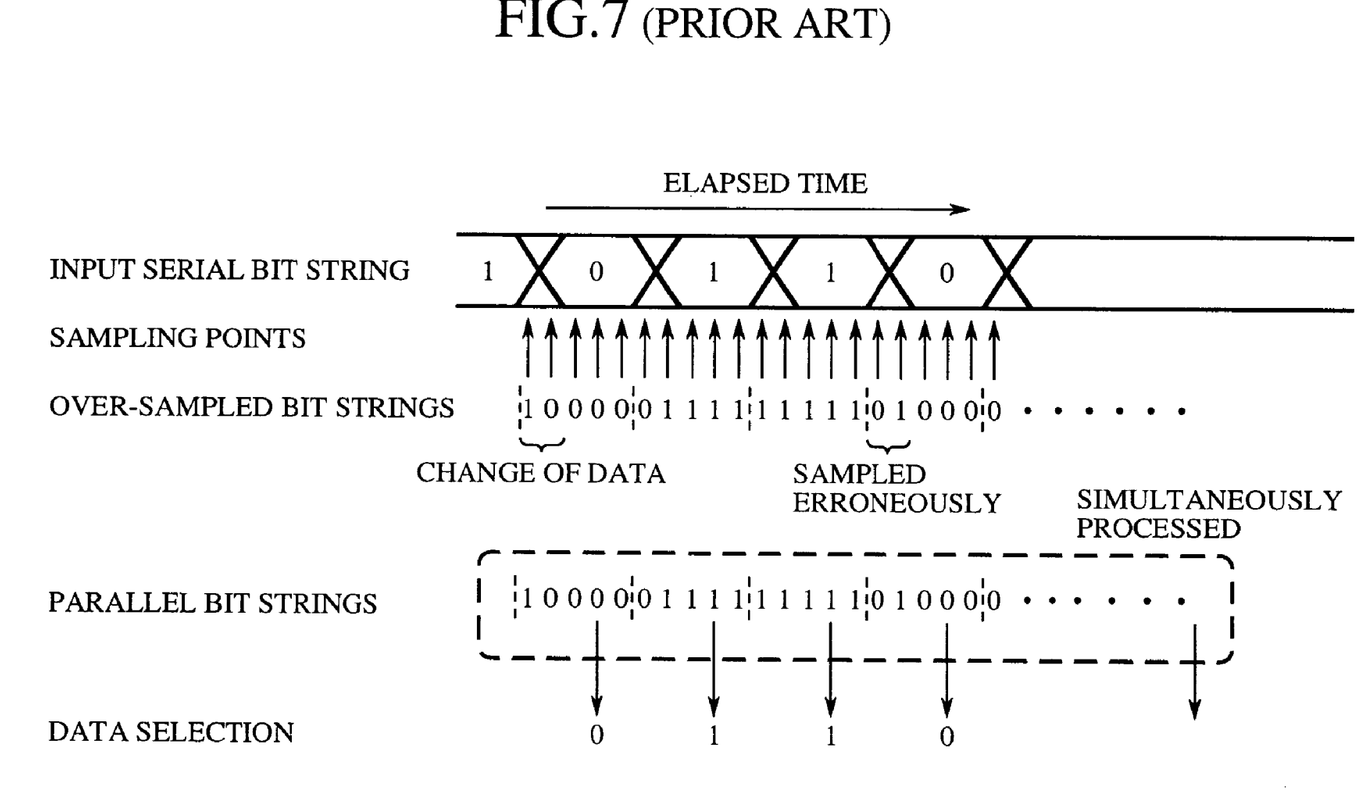
FIG. 7 is an explanatory view of an over-sampling method performed for an input serial bit string in the conventional serial data receiving device shown in FIG. 6.

In detail, as shown in FIG. 7, binary digits are sampled from an input serial bit string at a sampling rate higher than a bit rate of the binary digits. For example, the sampling is performed five times during a time period corresponding to one binary digit to obtain five sampled binary digits for each binary digit. Therefore, an amount of sampled binary digits is five times larger than an amount of binary digits of the input serial bit string. Though there is a probability that data sampled at positions near change points is incorrect, there is a high probability that data sampled at positions far from change points is correct. In the over-sampling method, data correctly sampled at a high probability is selected from five sampled binary digits corresponding to each binary digit of the bit string, and a set of parallel bit strings composed of pieces of data correctly sampled at a high probability are obtained from the input serial bit string.

Figure 6:
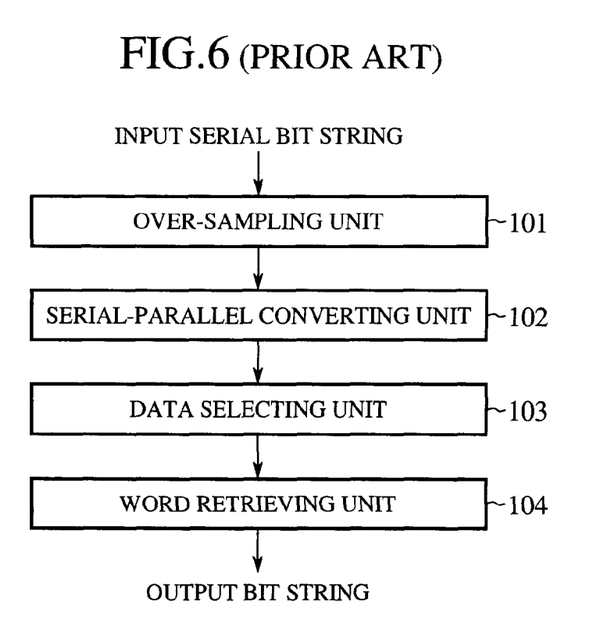
FIG. 6 is a block diagram showing the configuration of a conventional serial data receiving device.

FIG. 6 is a block diagram showing the configuration of a conventional serial data receiving device. In FIG. 6, 101 indicates an over-sampling unit for performing the over-sampling N times (for example, N=5) for each input binary digit of an input serial bit string to obtain a serial bit string of over-sampled binary digits from the input serial bit string. 102 indicates a serial-parallel converting unit for converting a plurality of over-sampled binary digits corresponding to each group of L input binary digits (for example, L=10) successively placed in the input serial bit string to a set of L parallel bit strings respectively composed of N over-sampled binary digits. 103 indicates a data selecting unit for selecting a correctly-sampled binary digit from N over-sampled binary digits of each parallel bit string to obtain a selected bit string composed of L correctly-sampled binary digits and to obtain a plurality of selected bit strings corresponding to the input serial bit string. 104 indicates a word retrieving unit for retrieving a string of words from the correctly-sampled binary digits of the selected bit strings.

Next, an operation of the conventional serial data receiving device will be described below.

FIG. 7 is an explanatory view of the over-sampling method performed in the conventional serial data receiving device for an input serial bit string. In this example, the number of over-sampling operations for each input binary digit is set to five.

When an input serial bit string composed of input binary digits serially arranged is received in the over-sampling unit 101, the sampling is performed five times for each input binary digit of the input serial bit string to obtain a serial bit string of over-sampled binary digits, and a plurality of over-sampled binary digits corresponding to each group of input binary digits successively placed in the input serial bit string are converted in the serial-parallel converting unit 102 to a set of parallel bit strings respectively composed of five over-sampled binary digits. The number of parallel bit strings is equal to the number of input binary digits corresponding to the conversion, and each parallel bit string corresponds to one input binary digit. In this example, fifty over-sampled binary digits corresponding to each group of ten input binary digits successively arranged in the input serial bit string are converted to a set of ten parallel bit strings composed of fifty over-sampled binary digits (5×10= 50). Therefore, an operating frequency of the conventional serial data receiving device can be reduced, each group of ten input binary digits included in the input serial bit string can be estimated at once, and the data selection and the word retrieval can be easily performed later.

Thereafter, in the data selecting unit 103, ten over-sampled binary digits correctly sampled at a high probability are selected from each set of ten parallel bit strings as a selected bit string of ten correctly-sampled binary digits. In this case, to select one over-sampled binary digit correctly sampled at a high probability from each parallel bit string, a method for finding out two successive over-sampled binary digits having different values at a high probability is often used. For example, a value of the first over-sampled binary digit differs from a value of the second over-sampled binary digit at a high probability in each of four parallel bit strings "10000", "01111", "11111" and "01000" shown in FIG. 7. In this case, it seems reasonable to conclude that the change point of each input binary digit in the input serial bit string is placed between the first over-sampled binary digit and the second over-sampled binary digit of the corresponding parallel bit string. Also, because the fourth over-sampled binary digit has the same value as those of the third and fifth over-sampled binary digits adjacent to the fourth over-sampled binary digit in each parallel bit string at a high probability, it seems that the value of each fourth over-sampled binary digit is stable. Therefore, the fourth over-sampled binary digit in each of ten parallel bit strings is selected as a correctly-sampled binary digit. Because the transmission time period for each input binary digit of the input serial bit string is normally constant, the change point of the input binary digit is placed every five over-sampled binary digits and is placed between the (5M+1)-th over-sampled binary digit and the (5M+2)-th over-sampled binary digit (M denotes zero or a positive integral number), and one (5M+4)-th over-sampled binary digit is to be selected as a correctly-sampled binary digit from each of ten parallel bit strings. In the example shown in FIG. 7, the fourth (M=0 in (5M+4)-th) over-sampled binary digit, the ninth (M=1 in (5M+4)-th) over-sampled binary digit,---, the forty-ninth (M=9 in (5M+4)-th) over-sampled binary digit are selected as ten correctly-sampled binary digits of one selected bit string.

However, in the actual operation, the input serial bit string undesirably receives the influence of noises, the change point of an input binary digit is moved, for example, from the position between the (5M+1)-th over-sampled binary digit and the (5M+2)-th over-sampled binary digit to the position between the (5M+2)-th over-sampled binary digit and the (5M+3)-th over-sampled binary digit. In this case, to reliably select correctly-sampled binary digits, one oversampled binary digit most stable among five over-sampled binary digits in each parallel bit string is selected as one correctly-sampled binary digit.

Thereafter, a plurality of selected bit strings respectively composed of ten correctly-sampled binary digits are successively input to the word retrieving unit 104. In general, a group of input binary digits preset to a predetermined bit number and expressing a fixed meaning is included many times in the input serial bit string. For example, in case of picture data, red information of one pixel, green information of one pixel and blue information of one pixel are respectively expressed by using a group of eight (or ten) binary digits. Therefore, when picture data is transmitted as an input serial bit string, a serial data receiving device is required to divide the input serial bit string every eight binary digits denoting a unit of pixel information. A bit string of input binary digits expressing a meaning is called a word. In the word retrieving unit 104, a boundary position between each pair of words is found out, the correctly-sampled binary digits of the selected bit strings are divided at the boundary positions, and a bit string of correctly-sampled binary digits corresponding to each word is output.

To easily find out a boundary position between each pair of words, a predetermined bit string preset to a predetermined bit number is many times included in the input serial bit string, and the input serial bit string including the predetermined bit strings is transmitted to a serial data receiving device during a prescribed time period. This predetermined bit string is called a referential word, and referential words included in the input serial bit string are transmitted in a referential word transmitting time period. In the word retrieving unit 104, the selected bit strings respectively composed of correctly-sampled binary digits are searched for one predetermined bit string expressing one referential word. In cases where the predetermined bit string expressing one referential word exists in the selected bit string of correctly-sampled binary digits, a boundary position between each pair of words can be found out by detecting the predetermined bit string expressing one referential word.

A referential word retrieving method will be described in detail below. For example, a bit number of each referential word is set to ten, and a bit number of each word desired to be transmitted is also set to ten. In the word retrieving unit 104, twenty correctly-sampled binary digits of each set of two selected bit strings output from the data selecting unit 103 are stored in a storing circuit having an area of twenty bits. The group of twenty correctly-sampled binary digits included in each set of two bit strings is searched for a referential word composed of ten over-sampled binary digits. As a searched result, in a case where it is found out that a group of ten over-sampled binary digits placed from sixth bit to fifteenth bit agrees with one referential word, the referential word is detected in the group of twenty correctly-sampled binary digits, and a starting point of the referential word placed at the sixth bit is detected. After the transmission of the input serial bit string including the referential words in the referential word transmitting time period, the input serial bit string not including any referential word but including desired words is transmitted to the serial data receiving device. In the word retrieving unit 104 of the device, a group of ten correctly-sampled binary digits starting from the sixth bit of twenty correctly-sampled binary digits in each set of two selected bit strings is retrieved as one word, and a string of words successively arranged is output.

As is described above, in the conventional serial data receiving device, the over-sampling is performed N times for each input binary digit of the input serial bit string each time L input binary digits of the input serial bit string is received, L correctly-sampled binary digits are selected from L sets of N over-sampled binary digits, and words are retrieved from the correctly-sampled binary digits. In the selecting processing of the correctly-sampled binary digits, each selected bit string of L correctly-sampled binary digits is determined from L parallel bit strings of N over-sampled binary digits by finding out the change point of the N over-sampled binary digits in each parallel bit string. However, in a case where the change point of the N over-sampled binary digits cannot be determined, it is required to select each correctly-sampled binary digit from each parallel bit string of N over-sampled binary digits according to statistical analysis. Therefore, in a case where the input serial bit string is considerably distorted due to the influence of noise, there is a probability that one oversampled binary digit not correctly sampled is erroneously selected as one correctly-sampled binary digit to produce an incorrect bit string, and the word retrieving operation for the referential word is performed for the incorrect bit string of 2*L correctly-sampled binary digits. In this case, no bit string agreeing with a referential word is found out from a bit string of 2*L correctly-sampled binary digits including the incorrect bit string. As a result, a problem has arisen that a string of words cannot be correctly received or output.

SUMMARY OF THE INVENTION

An object of the present invention is to provide, with due consideration to the drawbacks of the conventional serial data receiving device, a serial data receiving device in which a string of words is correctly received and output even though input serial data is considerably distorted.

The object is achieved by the provision of a serial data receiving device including over-sampling means, serial-parallel converting means, data dividing means, data retrieving means and output data selecting means. In the over-sampling means, a sampling operation is performed N-th times for each input binary digit of an input serial bit string having a referential word, and a plurality of over-sampled binary digits are produced. In the serial-parallel converting means, an over-sampling bit string of the over-sampled binary digits is converted to a plurality of parallel bit strings respectively corresponding to one input binary digit of the input serial bit string. In the data dividing means, the N over-sampled binary digits of each parallel bit string are divided to N groups to produce N divided bit strings corresponding to the N groups of sampling operations. In the data retrieving means, a plurality of divided bit strings having the referential word are detected, a group specified result indicating a plurality of groups corresponding to the divided bit strings having the referential word is output, and a string of desired data is retrieved from each divided bit string having the referential word. In the output data selecting means, one group is selected as a final selected group from the groups of the group specified result, and the string of desired data corresponding to the final selected group is output as an output bit string.

Accordingly, even though the input serial bit string is considerably distorted, a string of words representing the string of desired data can be correctly retrieved from the input serial bit string and can be output.

DETAILED DESCRIPTION OF THE PREFERRED EMBODIMENTS

Embodiments of the present invent ion will now be described with reference to the accompanying drawings.

Embodiment 1

Figure 1:
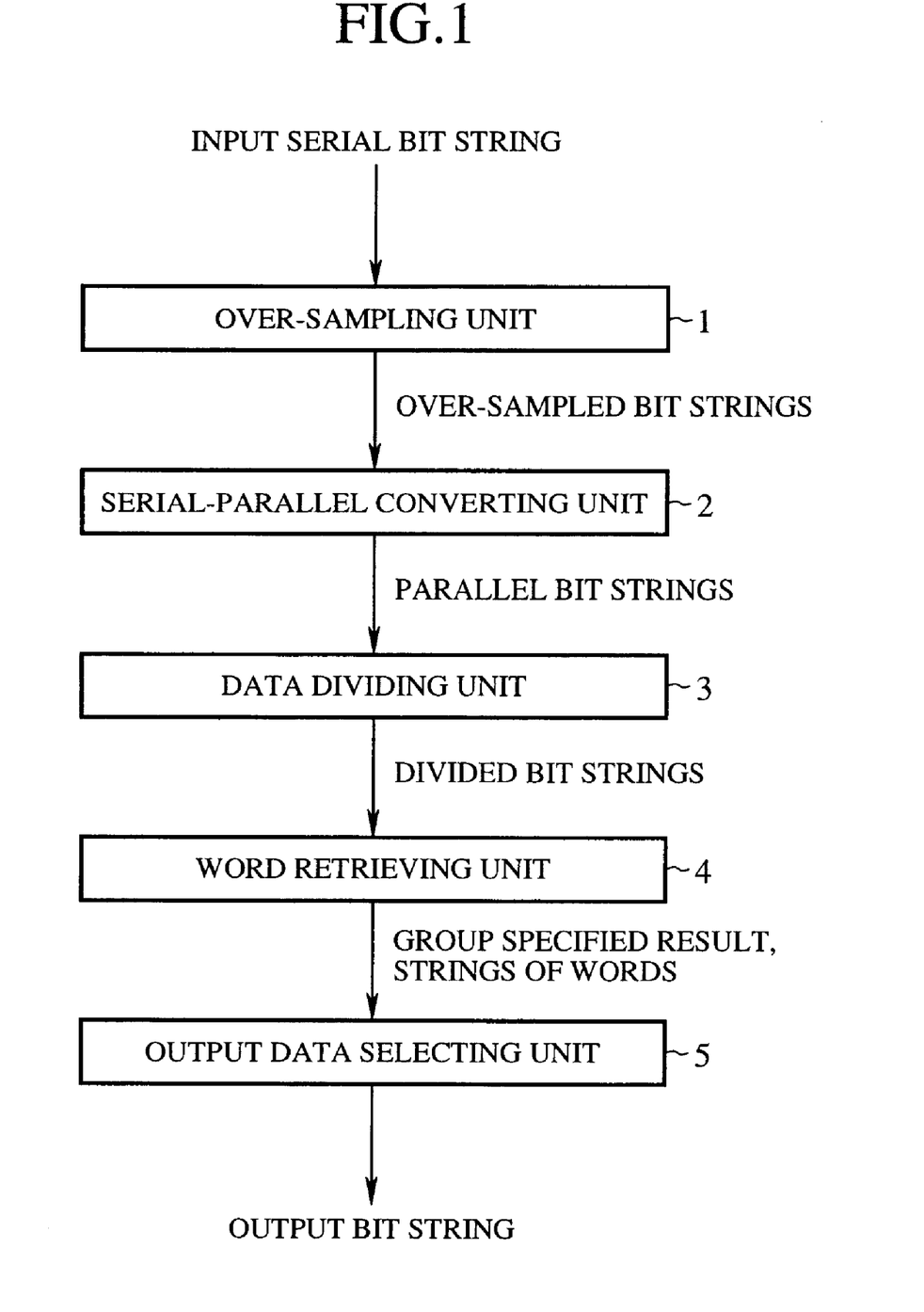
FIG. 1 is a block diagram showing the configuration of a serial data receiving device according to first and second embodiments of the present invention.
Figure 2:
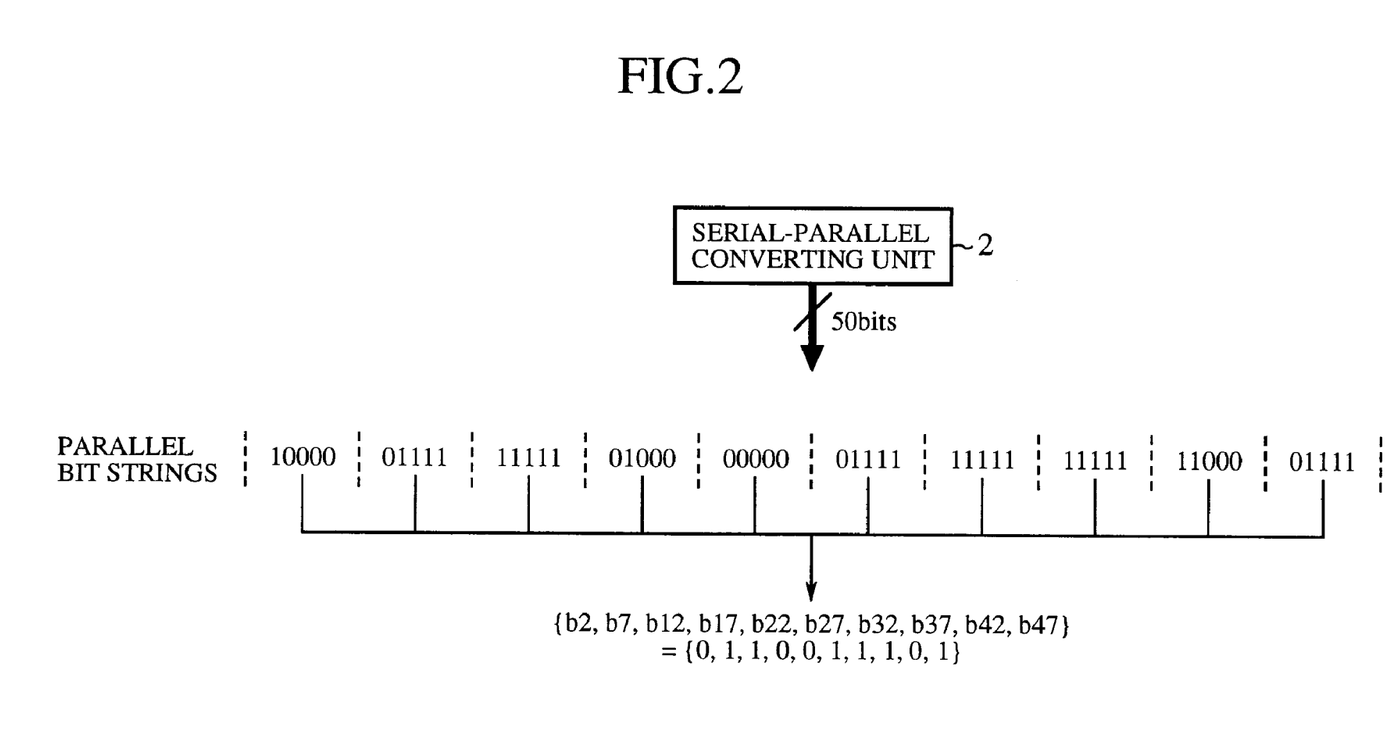
FIG. 2 shows the division of a group of ten parallel bit strings performed in a data dividing unit shown in FIG. 1.

FIG. 1 is a block diagram showing the configuration of a serial data receiving device according to a first embodiment of the present invention, and FIG. 2 shows the division of a group of ten parallel bit strings performed in a data dividing unit shown in FIG. 1.

In FIG. 1, 1 indicates an over-sampling unit (or over-sampling means) for receiving an input serial bit string composed of input binary digits which express referential words in a referential word transmitting time period and express a string of desired words after the referential word transmitting time period, performing the over-sampling N times (for example, N=5) for each input binary digit of the input serial bit string to produce a serial over-sampling bit string composed of a plurality of over-sampled binary digits. Each input binary digit corresponds to the first over-sampled binary digit obtained in the first sampling, the second over-sampled binary digit obtained in the second sampling,--, and the N-th over-sampled binary digit obtained in the N-th sampling in case of N=5.

2 indicates a serial-parallel converting unit (or over-sampled data dividing means) for converting a plurality of over-sampled binary digits of the serial over-sampling bit string, which correspond to each group of L input binary digits (for example, L=10) successively placed in the input serial bit string, to a set of L parallel bit strings respectively composed of N over-sampled binary digits. Each parallel bit string corresponds to one input binary digit of the input serial bit string.

3 indicates a data dividing unit (or over-sampled data dividing means) for dividing the N over-sampled binary digits of each parallel bit string into a first sampling group, a second sampling group,--, and an N-th sampling group. A first divided bit string of the L first over-sampled binary digits corresponding to a first group of sampling operations, a second divided bit string of the L second over-sampled binary digits corresponding to a second group of sampling operations,--, and an N-th divided bit string of the L N-th over-sampled binary digits corresponding to an N-th group of sampling operations are obtained.

4 indicates a word retrieving unit (or data retrieving means) for combining K divided bit strings (K denotes a positive integral number. For example, K =2) of the first group, which are composed of K×L first over-sampled binary digits of K sets of L parallel bit strings successively divided in the data dividing unit 3, with each other to produce a first referential word searching bit string composed of the K×L first over-sampled binary digits, combining K divided bit strings of the second group, which are composed of K×L second over-sampled binary digits of the K sets of L parallel bit strings, with each other to produce a second referential word searching bit string composed of the K×L second over-sampled binary digits,--, combining K divided bit strings of the N-th group, which are composed of K×L N-th over-sampled binary digits of the K sets of L parallel bit strings, with each other to produce an N-th referential word searching bit string composed of the K×L N-th over-sampled binary digits, searching each referential word searching bit string for one referential word in the referential word transmitting time period to specify the group corresponding to each referential word searching bit string having the referential word and to specify a word start position of the referential word in each referential word searching bit string having the referential word, outputting a group specified result indicating both information of the specified group(s) and information of the word start position (s) for all the referential word searching bit string(s) having the referential word in the referential word transmitting time period, retrieving a string of desired words from the divided bit strings of each specified group according to the information of the word start position after the referential word transmitting time period, and outputting the string of desired words corresponding to each specified group.

5 indicates an output data selecting unit (or output data selecting means) for selecting a selected group, of which the over-sampled binary digits are correctly sampled at the highest probability, from the specified groups according to the group specified result in the referential word transmitting time period, determining the selected group as a final selected group just after the referential word transmitting time period, and outputting the string of desired words corresponding to the final selected group as an output bit string after the referential word transmitting time period.

Next, an operation of the serial data receiving device will be described below.

To simplify the explanation of the operation, the over-sampling is performed five times for each input binary digit of an input serial bit string, each referential word is composed of ten input binary digits, each desired word is composed of ten input binary digits.

When an input serial bit string composed of input binary digits serially arranged is received in the over-sampling unit 1, the sampling is performed five times for each input binary digit of the input serial bit string to obtain an over-sampling bit string of over-sampled binary digits. Therefore, the first over-sampled binary digit, the second over-sampled binary digit, the third over-sampled binary digit, the fourth over-sampled binary digit and the fifth over-sampled binary digit are obtained from each input binary digit.

Thereafter, in the serial-parallel converting unit 2, fifty over-sampled binary digits of the over-sampling bit string corresponding to each group of ten input binary digits successively placed in the input serial bit string are converted to a set of ten parallel bit strings respectively composed of five over-sampled binary digits. Here, each parallel bit string of five over-sampled binary digits is obtained from one input binary digit.

Thereafter, in the data dividing unit 3, each set of ten parallel bit strings {b0, b1, b2, b3, b4}, {b5,--, b9},--, {b45, b46, b47, b48, b49} is divided into five groups corresponding to five divided bit strings. A first divided bit string {b0, b5, b10,--, b45} of a first group G0 is composed of ten first over-sampled binary digits obtained in the first group of sampling operations, a second divided bit string {b1, b6, b11,--, b46} of a second group G1 is composed of ten second over-sampled binary digits obtained in the second group of sampling operations, a third divided bit string {b2, b7, b12,--, b47} of a third group G2 is composed of ten third over-sampled binary digits obtained in the third group of sampling operations, a fourth divided bit string {b3, b8, b13,--, b48} of a fourth group G3 is composed of ten fourth over-sampled binary digits obtained in the fourth group of sampling operations, and a fifth divided bit string {b4, b9, b14,--, b49} of a fifth group G4 is composed of ten fifth over-sampled binary digits obtained in the fifth group of sampling operations. The third divided bit string of the third group G2 is shown in FIG. 2 as an example.

Thereafter, the set of five divided bit strings is received in the word retrieving unit 4 each time one group of ten input binary digits is received in the device. In the word retrieving unit 4, the word searching processing is performed to search two divided bit strings corresponding to twenty input binary digits for a referential word for each group in the referential word transmitting time period, to detect a word start position of the referential word and to retrieve a string of desired words from divided bit strings according to the word start position.

Figure 3:
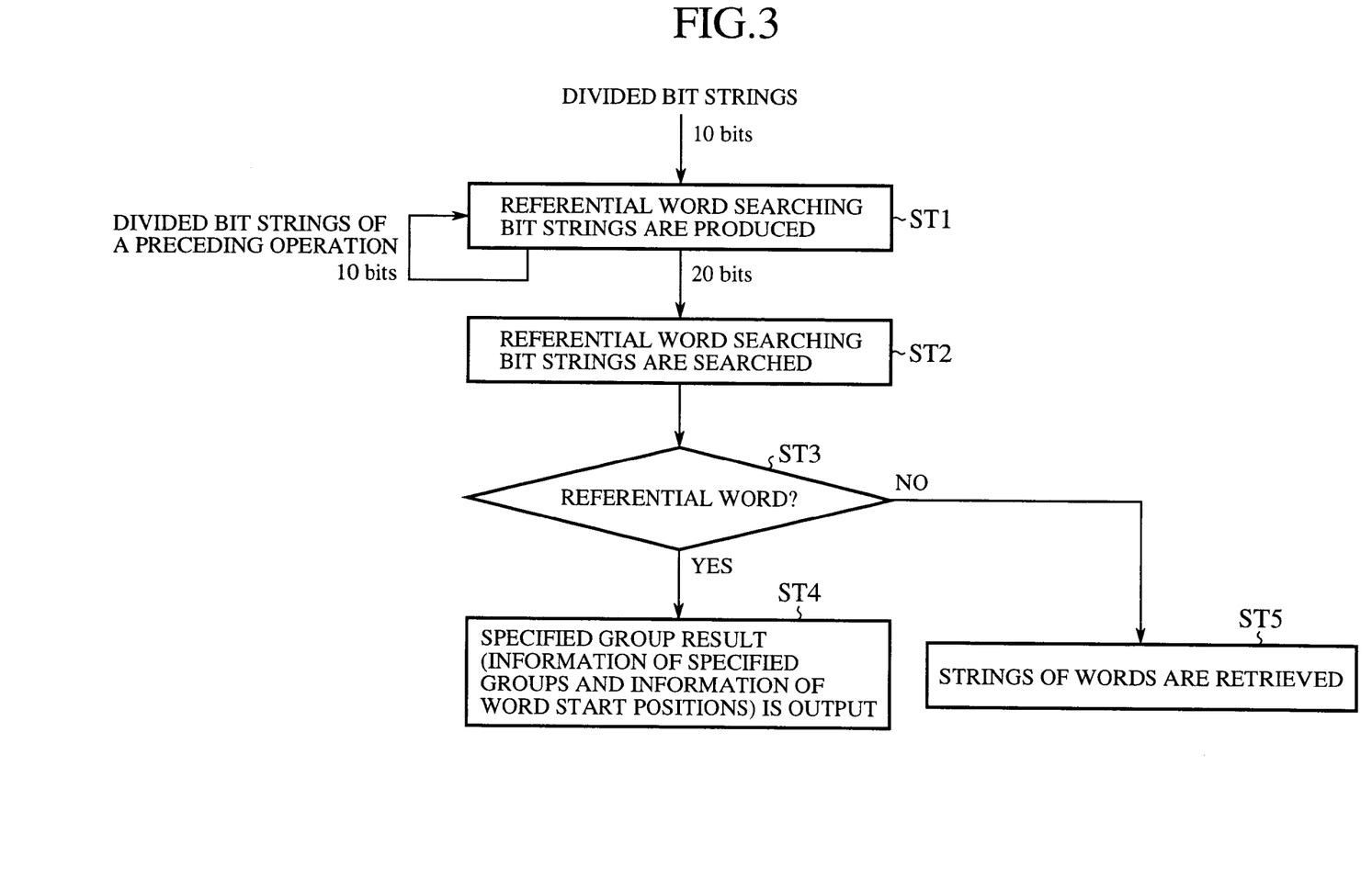
FIG. 3 is a flow chart showing the word retrieving processing performed in a word retrieving unit shown in FIG. 1 for two divided bit strings of each group corresponding to twenty input binary digits.

FIG. 3 is a flow chart showing the word retrieving processing performed in the word retrieving unit 4 for two divided bit strings of each group corresponding to twenty input binary digits.

When the five divided bit strings of the groups G0 to G4 corresponding to each set of ten input binary digits successively arranged are received in the word retrieving unit 4, in a step ST1, the divided bit string of the group G0 corresponding to a current set of ten input binary digits is combined with the divided bit string of the group G'0 corresponding to a preceding set of ten input binary digits to produce a referential word searching bit string Gw0={b'0, b'5, b'10,--, b'45, b0, b5, b10,--, b45} corresponding to the group G0. In the same manner, in the step ST1, a referential word searching bit string Gw1={b'1, b'6, b'11,--, b'46, b1, b6, b11,--, b46} corresponding to the group G1, a referential word searching bit string Gw2={b'2, b'7, b'12,--, b'47, b2, b7, b12,--, b47} corresponding to the group G2, a referential word searching bit string Gw3={b'3, b'8, b'13,--, b'48, b3, b8, b13,--, b48} corresponding to the group G3 and a referential word searching bit string Gw4={b'4, b'9, b'14,--, b'49, b4, b9, b14,--, b49} corresponding to the group G4 are produced by combining each of the divided bit strings G2 to G4 currently received and each of the divided bit strings G'2 to G'4 received just before the reception of the divided bit strings G2 to G4. For example, in case of the third divided bit string of the group G2, when a divided bit string of the group G2 is currently received in the word retrieving unit 4, another divided bit string of the group G2 already received just before the current reception of the divided bit string of the group G2 is set as a divided bit string of the group G'2, and the divided bit string of the group G2 is combined with the divided bit string of the group G'2 to produce a referential word searching bit string Gw2 corresponding to the group G2.

Thereafter, in a step ST2, the referential word searching processing is performed for each referential word searching bit string by searching the referential word searching bit string for the predetermined bit string of ten-bit length expressing the referential word. Thereafter, in a step ST3, it is judged whether or not the referential word exists in at least one of the referential word searching bit strings.

In a referential word transmitting time period, referential words are included in the input serial bit string. Therefore, in the referential word transmitting time period, one referential word exists in at least one referential word searching bit string. Therefore, it is judged in the step ST3 that the referential word exists in at least one referential word searching bit string. Thereafter, in a step ST4, a group corresponding to each referential word searching bit string having the referential word is specified, a word start position of the referential word of each referential word searching bit string is detected, and a group specified result indicating both information of the specified group(s) and information of the word start position(s) is output to the output data selecting unit 5. For example, when the referential word searching bit string Gw2={b'2, b'7, b'12,--, b'47, b2, b7, b12,--, b47} obtained from the divided bit strings of the groups G2' and G2 is searched for the referential word, the binary digits from the third bit"b'12" to the twelfth bit "b7" in the referential word searching bit string Gw2 agree with the predetermined bit string expressing the reference word. In this case, information of the group G2 and information of the third bit denoting the word start position are output to the output data selecting unit 5 as a group specified result. The outputting of the group specified result to the output data selecting unit 5 is performed during the referential word transmitting time period each time a set of ten input binary digits of the input serial bit string is received.

In the output data selecting unit 5, in a case where only the group specified result corresponding to one referential word searching bit string is received in response to the reception of one set of ten input binary digits of the input serial bit string, the specified group corresponding to the referential word searching bit string is set as a selected group. For example, in a case where information indicating the group G2 is only received in the output data selecting unit 5 because no referential word exists in each of the referential word searching bit strings Gw0, Gw1, Gw3 and Gw4, the group G2 is set as a selected group.

In contrast, in a case where a plurality of specified groups corresponding to a plurality of referential word searching bit strings are received in response to the reception of one set of ten input binary digits of the input serial bit string, one group is selected as a selected group from the specified groups.

In a case where there are referential words in a plurality of referential word searching bit strings corresponding to a plurality of specified groups other than a remaining group or a plurality of remaining groups, a method of selecting one group from the specified groups will be described in detail below. As an example, there are referential words in the referential word searching bit strings Gw1, Gw2 and Gw3 corresponding to the groups G1, G2 and G3, and there is no referential word in the referential word searching bit strings Gw0 and Gw4 corresponding to the groups G0 and G4. In this case, though one referential word composed of ten predetermined binary digits is included in twenty binary digits of the input serial bit string, because the change point is placed near both the first over-sampled binary digit and the fourth over-sampled binary digit, it is surely concluded that it is failed to correctly perform the over-sampling for two first divided bit strings and two fifth divided bit strings of the referential word searching bit strings Gw0 and Gw4.

Therefore, it is preferred that one of the specified groups G1, G2 and G3 is set as a selected group. In this case, as a group selecting concept, it is generally reasonable that the group G2 furthest from the failed groups G0 and G4 is set as a selected group. Hereinafter, a practical method of selecting one group from a plurality of specified groups in the output data selecting unit 5 will be described.

In a case where the referential word is found out in an odd number of (three or five in this embodiment) referential word searching bit strings in the word retrieving unit 4, an odd number of groups corresponding to the referential word searching bit strings are arranged in a cyclic order, and a group placed in the center of the rearranged groups is determined as a selected group. For example, in a case where the referential word is found out in the referential word searching bit strings Gw0, Gw1 and Gw2, the group G1 placed in the center of the groups {G0, G1, G2} arranged in the cyclic order is set to a selected group. Also, in a case where the referential word is found out in the referential word searching bit strings Gw0, Gw3 and Gw4, the group G4 placed in the center of the groups {G3, G4, G0} arranged in the cyclic order is set to a selected group. Also, in the same manner, in a case where the referential word is found out in the referential word searching bit strings Gw0, Gw1 and Gw4, the group G0 placed in the center of the groups {G4, G0, G1} arranged in the cyclic order is set to a selected group.

In a case where the referential word is currently found out in an even number of (two or four in this embodiment) referential word searching bit strings corresponding to a current set of twenty input binary digits of the input serial bit string in the word retrieving unit 4, an even number of groups corresponding to the referential word searching bit strings are arranged in a cyclic order, two groups placed in the center of the groups is selected, and one of the two groups near to a preceding selected group determined in the reception of a preceding set of twenty input binary digits of the input serial bit string is currently selected as a selected group. For example, in a case where the referential word is currently found out in the referential word searching bit strings Gw1, Gw2, Gw3 and Gw4 after the determination of a preceding selected group G3 in response to a preceding set of twenty input binary digits of the input serial bit string, two groups G2 and G3 placed in the center of the groups {G1, G2, G3, G4} are selected from the groups G1 to G4, and the group G3 near to the preceding selected group G3 is currently selected from the groups G2 and G3. Also, in a case where the referential word is currently found out in the referential word searching bit strings Gw0, Gw1, Gw3 and Gw4 after the determination of a preceding selected group G3 in response to a preceding set of twenty input binary digits of the input serial bit string, two groups G4 and G0 placed in the center of the groups {G3, G4, G0, G1} are selected, and the group G4 near to the preceding selected group G3 is currently selected as a selected group from the groups G4 and G0.

After the referential word transmitting time period, no referential word is included in the input serial bit string, but only data (or words) desired to be transmitted is included in the input serial bit string and is transmitted to the serial data receiving device. Therefore, in the word retrieving unit 4, no referential word is found out in each of all the referential word searching bit strings Gw0 to Gw4 in the step ST3, and no group specified result is output to the output data selecting unit 5.

Also, desired words exist in a plurality of referential word searching strings corresponding to each group, which is latest specified in the referential word transmitting time period, after the referential word transmitting time period, and each desired word existing in each referential word searching string produced after the referential word transmitting time period is started from the word start position latest detected in the step ST4. Therefore, in the word retrieving unit 4, a series of ten-bit length strings is retrieved from the referential word searching strings of each latest-specified group according to the word start position latest detected as a string of words. That is, a string of words is retrieved from the divided bit strings of each latest-specified group according to the word start position latest detected in the step ST4. The string of words corresponding to each latest-specified group is output to the output data selecting unit 5 after the referential word transmitting time period (step ST5).

For example, a series of ten-bit length strings is retrieved from the divided bit strings of the group G2 according to the word start position of the third bit latest detected in the step ST4 as a string of words, and the string of words corresponding to the group G2 is output to the output data selecting unit 5 after the referential word transmitting time period.

In the output data selecting unit 5, because no group specified result is received, the selected group latest selected in the output data selecting unit 5 is automatically determined as a final selected group in the output data selecting unit 5. Also, when the string of words corresponding to each specified group is received from the word retrieving unit 4, it is judged that the string of words corresponding to the final selected group is correctly sampled at the highest probability from the input serial bit string, and the string of words corresponding to the final selected group is output as an output bit string obtained from the input serial bit string.

As is described above, in the first embodiment, the over-sampling is performed N times for each binary digit of the input serial bit string including referential words in the referential word transmitting time period and including desired words after the referential word transmitting time period, sampled data of the first group composed of all the first over-sampled binary digits, sampled data of the second group composed of all the second over-sampled binary digits,--, and sampled data of the N-th group composed of all the N-th over-sampled binary digits are obtained, and the sampled data of each group is searched for the reference word. In the referential word transmitting time period, the reference word is found out in the sampled data of only one specified group or a plurality of specified groups, one specified group corresponding to the sampled data correctly sampled at the highest probability is selected from the specified groups as a selected group, the selected group is appropriately changed to another during the start time per referential word transmitting time period, and the selected group latest determined is set as a final selected group when the referential word transmitting time period is over. Also, a word start position of the referential word in the sampled data of each specified group is detected. After the referential word transmitting time period, the input serial bit string includes only words desired to be transmitted, a string of desired words is retrieved from the sampled data of the final selected group according to the word start position corresponding to the final selected group. Accordingly, even though the input serial bit string is considerably distorted due to the influence of noises, it is estimated that the final selected group of sampled data selected from a plurality of groups of sampled data corresponding to the over-sampling does not receive the adverse influence of noises and is correctly sampled at the highest probability, the word start position corresponding to the final selected group is detected, and a string of words retrieved from the sampled data of the final selected group can be output as an output bit string obtained from the input serial bit string.

In the first embodiment, the string of words correctly sampled at the highest probability is sampled after the referential word transmitting time period on condition that no desired word is included in the input serial bit string during the referential word transmitting time period. However, in a case where the input serial bit string include referential words and desired words during the referential word transmitting time period, the step ST5 shown in FIG. 3 is performed during the referential word transmitting time period when no referential word exists in the referential word searching string corresponding to each group, a string of desired words is retrieved in the word retrieving unit 4 from the divided bit stings of each group according to the word start position of the group lately detected, the string of desired words corresponding to the selected group lately determined is output as an output bit string from the output data selecting unit 5.

Embodiment 2

In the first embodiment, the final selected group and the word start position are determined when the referential word transmitting time period is over, the string of words are retrieved from the sampled data of the final selected group according to the word start position after the referential word transmitting time period, and the string of words are output as an output bit string. In a case where the distortion of the input serial bit string is comparatively low, a small-sized serial data receiving device can be manufactured to perform the above-described word retrieving processing at high speed, and this serial data receiving device is useful. However, in a case where the input serial bit string is further considerably distorted, the change point of the data of the input serial bit string is changed with time, and a group of sampled data correctly sampled at the highest probability is changed with time after the referential word transmitting time period. Therefore, even though the final selected group and the word start position of the final selected group are determined when the referential word transmitting time period is over, there is a probability that a string of words cannot be retrieved from sampled data correctly sampled at the highest probability.

In a second embodiment, after the referential word transmitting time period is over, the final selected group and the word start position of the final selected group are appropriately changed by the function of both the word retrieving unit 4 and the output data selecting unit 5. The oversampling is performed five times for each input binary digit of the input serial bit string in the same manner as in the first embodiment.

Figure 4:
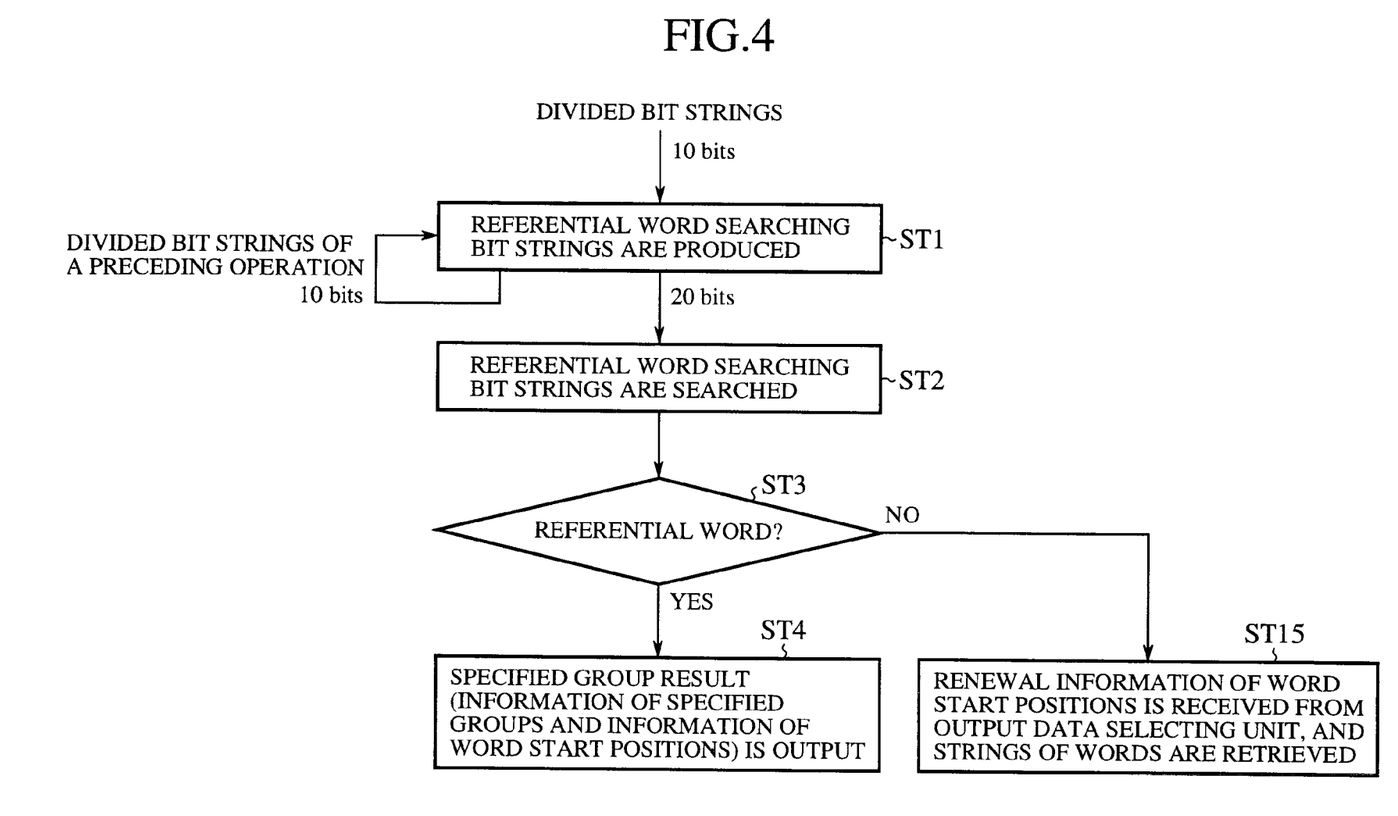
FIG. 4 is a flow chart showing the word retrieving processing performed in a word retrieving unit shown in FIG. 1 for two divided bit strings of each group corresponding to twenty input binary digits according to a second embodiment of the present invention.
Figure 5:
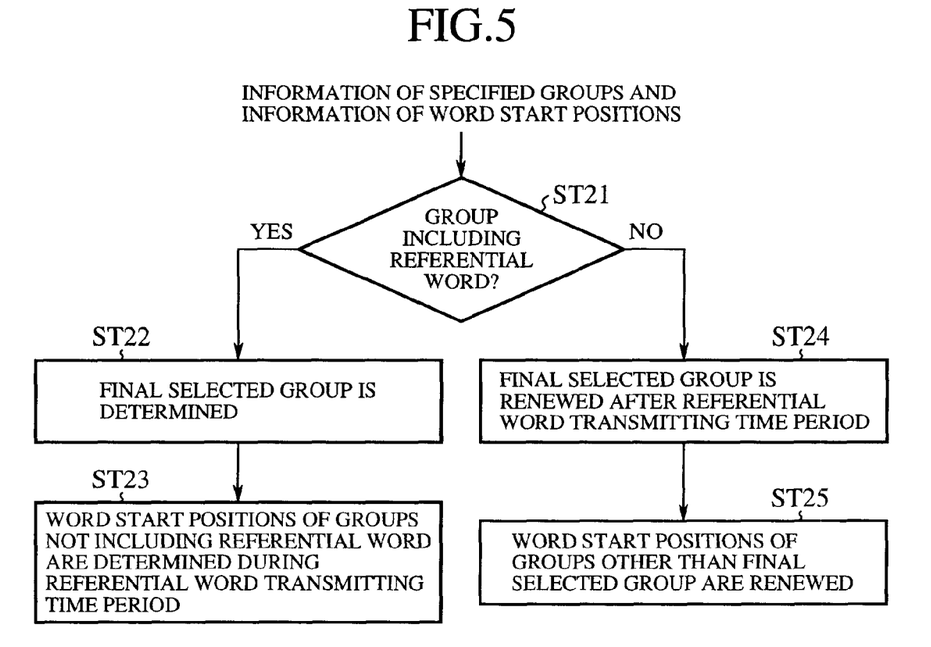
FIG. 5 is a flow chart showing the data selecting processing performed in the output data selecting unit 5 according to the second embodiment of the present invention.

FIG. 4 is a flow chart showing the word retrieving processing performed in the word retrieving unit 4 for two divided bit strings of each group corresponding to twenty input binary digits according to a second embodiment of the present invention. FIG. 5 is a flow chart showing the data selecting processing performed in the output data selecting unit 5 according to the second embodiment of the present invention.

In the referential word transmitting time period, the group specified result indicating the information of the specified group and the information of the word start position of the specified group is output to the output data selecting unit 5 for each referential word searching bit string having the referential word in the same manner as in the first embodiment (step ST4).

In the output data selecting unit 5, when the group specified results are received from the word retrieving unit 4, it is judged in a step ST21 whether or not the group including the referential word exists. Because one group or a plurality of groups include the referential word, the selected group is determined, the selected group finally determined in the referential word transmitting time period is set as a final selected group, and a string of words retrieved from the divided bit strings of the final selected group is output as an output bit string in the same manner as in the first embodiment (step ST22).

Also, in a case where one remaining group or a plurality of remaining groups other than the specified groups(s) do not include the referential word in a current operation, a word start position in the referential word searching bit string corresponding to each remaining group is not determined in the word retrieving unit 4. Therefore, in a case where a referential word searching bit string corresponding to the same group as one remaining group of the current operation is searched for the referential word in a succeeding operation, because a word start position of the referential word searching bit string is unknown in the succeeding operation, it takes a long time to search the referential word searching bit string for the referential word in the succeeding operation. However, in a case where a word start position in the referential word searching bit string corresponding to each remaining group is determined in the current operation in the output data selecting unit 5, it is easy to search a referential word searching bit string corresponding to each group for the referential word in the succeeding operation by using the word start position of the group. Therefore, in a step ST23, a word start position of each remaining group is determined in a current operation according to the selected group, and the word start position of each remaining group is sent to the word retrieving unit 4 as information of the word start position of each remaining group to use the information in the step ST3 of a succeeding operation.

Here, a method of determining a word start position of one remaining group will be described below. The selected group is expressed by Gi, and all the groups G0 to G4 are arranged in the cyclic order so as to place the selected group Gi in the center of the groups G0 to G4 arranged in the cyclic order. For example, in case of Gi=G2, the groups G0 to G4 are arranged in the cyclic order of {G0, G1, G2, G3, G4}. In case of Gi=G0, the groups G0 to G4 are arranged in the cyclic order of {G3, G4, G0, G1, G2}. Also, in case of Gi=G4, the groups G0 to G4 are arranged in the cyclic order of {G2, G3, G4, G0, G1}. Thereafter, each remaining group not including the referential word is expressed by Gj, and a word start position of the remaining group Gj is determined as follows.

In a first case, j<i is satisfied, and Gj is placed on the right side (or in the rear) of Gi in the cyclic order. In this case, a word start position of the remaining group Gj is equal to a value obtained by adding one to the word start position of the group Gi. For example, in case of Gi=G4, Gj=G1 and the word start position "3" of the group G4, the word start position of the remaining group G1 is set to "4".

In a second case, i<j is satisfied, and Gj is placed on the left side (or in front) of Gi in the cyclic order. In this case, a word start position of the remaining group Gj is equal to a value obtained by subtracting one from the word start position of the group Gi. For example, in case of Gi=G0, Gj=G3 and the word start position "3" of the group G0, the word start position of the remaining group G3 is set to "2".

In other cases, the word start position of the remaining group Gj is equal to the word start position of the group Gi.

Therefore, because the word start positions of all the groups G0 to G4 are determined in a current operation, a referential word searching bit string corresponding to each group can be easily searched for the referential word in a succeeding operation by using the word start position of the group.

Also, the word start positions of all the groups G0 to G4 including the final selected group have been determined when the final selected group is determined after the referential word transmitting time period. Therefore, as is described later in detail, a changing operation of the final selected group can be easily performed by using the word start positions of all the groups.

After the referential word transmitting time period, in the word retrieving unit 4, because it is judged that no referential word exists in each of the referential word searching bit strings Gw0 to Gw4 (step ST3), a string of words is retrieved from the divided bit strings of each group according to information of the word start position sent from the output data selecting unit 5 (step ST15).

Thereafter, in the output data selecting unit 5, it is judged in the step ST21 that no group including the referential word exists, and the final selected group is again selected in a step ST24.

In a case where the change point of data in the input serial bit string changes with time due to the distortion of the input serial bit string after the referential word transmitting time period, because no referential word is received, it is required to judge according to a probability theory whether or not two divided bit strings of each group are correctly sampled at high probability. In a case where a plurality of groups of divided bit strings respectively corresponding to twenty input binary digits include the same bit string of a ten-bit length corresponding to one word length, there is a high probability that the divided bit strings of the groups are correctly sampled. In this case, it is surely concluded that the divided bit strings of one group placed in the center of the groups arranged in the cyclic order are sampled when the input serial bit string is set to the most stable state. In contrast, in a case where no pair of groups corresponding to twenty input binary digits includes the same bit string of a ten-bit length corresponding to one word length, there is a probability that the twenty input binary digits of the input serial bit string are considerably distorted. In this case, because a finally selected group of a preceding selection includes data correctly sampled at the highest probability, in a case where the finally selected group of the preceding selection is adopted as a finally selected group of a current selection, there is a high probability that the finally selected group of the current selection includes data correctly sampled.

A method of determining a new final selected group Gi' of a current selection from a final selected group Gi of a preceding selection will be described below. This method is performed in the step ST24.

The groups G0 to G4 are arranged to place the final selected group Gi in the center of groups G0 to G4 arranged in the cyclic order. Thereafter, the reference word searching bit strings of a plurality groups successively arranged are compared with each other. For example, in case of Gi=G2, the groups G0 to G4 are arranged in the cyclic order {G0, G1, G2, G3, G4}, the pair of groups G3 and G4, the pair of groups G4 and G0, the pair of groups G0 and G1, the pair of groups G1 and G2, the pair of groups G2 and G3, three groups G0, G1 and G2, three groups G1, G2 and G3, three groups G2, G3 and G4, three groups G3, G4 and G0, three groups G4, G0 and G1, four groups G0, G1, G2 and G3, four groups G1, G2, G3 and G4, four groups G2, G3, G4 and G0, four groups G3, G4, G0 and G1, four groups G4, G0, G1 and G2, and five groups G0, G1, G2, G3 and G4 are respectively compared with each other.

In a case where no pair of groups have the same bit string of a ten-bit length corresponding to one word length, it is assumed that the input serial bit string are considerably distorted in a current selection, and the new final selected group Gi' of the current selection is set to the final selected group Gi of the preceding selection. In this case, a word start position of the new final selected group Gi' is set to that of the final selected group Gi.

In a case where one pair of groups including the final selected group Gi have the same bit string of a ten-bit length, the group Gi is selected from the two groups, and the new final selected group Gi' of the current selection is set to the final selected group Gi of the preceding selection. In this case, a word start position of the new final selected group Gi' is set to that of the final selected group Gi.

In a case where no pair of groups including the final selected group Gi have the same bit string of a ten-bit length but one pair of groups not including the final selected group Gi have the same bit string of a ten-bit length, one group Gk near to the group Gi is selected from the two groups, and the group Gk is set as the new final selected group Gi' of the current selection. For example, the pair of groups G0 and G1 have the same bit string, the group G1 near to the group G2 is selected from the two groups G0 and G1, and the group G1 is set as the new final selected group Gi' of the current selection. In this case, a word start position of the new final selected group Gi' is set to that of the group Gk.

In a case where an odd number of (three or five) groups have the same bit string of a ten-bit length, the group Gk placed in the center of the groups is selected from the groups, and the group Gk is set as the new final selected group Gi' of the current selection. For example, three groups G0, G1 and G2 have the same bit string, the group G1 placed in the center of the groups G0, G1 and G2 is selected from the three groups G0, G1 and G2, and the group G1 is set as the new final selected group Gi' of the current selection. In this case, a word start position of the new final selected group Gi' is set to that of the group Gk.

In a case where an even number of (or four) groups larger than two groups have the same bit string of a ten-bit length, two groups placed in the center of the groups are selected from the groups, one group Gk near to the group Gi is selected from the two groups, and the group Gk is set as the new final selected group Gi' of the current selection. For example, four groups G0, G1, G2 and G3 have the same bit string, the groups G1 and G2 are selected, and the group G2 near to the group G2 is selected from the two groups G1 and G2, and the group G2 is set as the new final selected group Gi' of the current selection. In this case, a word start position of the new final selected group Gi' is set to that of the group Gk.

Thereafter, in a step ST25, word start positions of groups other than the new final selected group Gi' are determined in the same manner as in the step ST23. In this determination of word start positions, the new final selected group Gi' is set to the final selected group Gi, and the groups other than the new final selected group Gi' are regarded as the remaining groups Gj. Thereafter, the word start positions of all the groups G0 to G4 are sent to the word retrieving unit 4 as renewal information of the word start positions.

Thereafter, in the word retrieving unit 4, a string of words is retrieved from the reference word searching bit strings of each group by using the renewal information of the word start position sent from the output data selecting unit 5 (step ST15), and the string of words corresponding to each group is sent to the output data selecting unit 5. In the output data selecting unit 5, the string of words corresponding to the new final selected group Gi' is selected and output as an output bit string.

As is described above, in the second embodiment, even though the change point of data of the input serial bit string is changed after the referential word transmitting time period, the string of words correctly sampled from the input serial bit string can be always output.

What is claimed is:

1. A serial data receiving device comprising:
over-sampling means for receiving an input serial bit string composed of a plurality of input binary digits expressing a referential word and a plurality of input binary digits expressing a string of desired data, and performing a sampling operation N-th times (N denotes a positive integral number higher than one) for each input binary digit of the input serial bit string to produce a plurality of over-sampled binary digits corresponding to N groups of sampling operations ranging from a first group of sampling operations to an N-th group of sampling operations;
serial-parallel converting means for converting an over-sampling bit string of the over-sampled binary digits produced by the over-sampling means to a plurality of parallel bit strings respectively corresponding to one input binary digit of the input serial bit string;
data dividing means for dividing the N over-sampled binary digits of each parallel bit string produced by the serial-parallel converting means to N groups to produce N divided bit strings corresponding to the N groups of sampling operations;
data retrieving means for searching each of the N divided bit strings produced by the data dividing means for the referential word, detecting one divided bit string or a plurality of divided bit strings having the referential word, outputting a group specified result indicating one group or a plurality of groups corresponding to the divided bit string or the divided bit strings having the referential word, and retrieving the string of desired data from each divided bit string having the referential word; and
output data selecting means for selecting a final selected group from the group or the groups of the group specified result output from the data retrieving means, and outputting the string of desired data, which is retrieved by the data retrieving means and corresponds to the final selected group, as an output bit string.

2. The serial data receiving device according to claim 1, wherein data retrieving means detects a word start position of the referential word from each divided bit string having the referential word and retrieves a plurality of words, which starts from the word start position of the divided bit string, respectively have a predetermined bit length and are successively arranged in series, from the divided bit string as the string of desired data.

3. The serial data receiving device according to claim 1, wherein the input serial bit string has a plurality of referential words in a referential word transmitting time period, the over-sampling means produces the over-sampled binary digits corresponding to the N groups of sampling operations each time the over-sampling means receives a prescribed number of input binary digits of the input serial bit string including one referential word, the output data selecting means selects one group in the referential word transmitting time period each time the over-sampling means receives the input serial bit string including one referential word, the output data selecting means sets the latest-selected group as the final selected group after the referential word transmitting time period, and the output data selecting means outputs the string of desired data, which is retrieved by the data retrieving means and corresponds to the final selected group, as an output bit string.

4. The serial data receiving device according to claim 3, wherein the output data selecting means rearranges the groups indicated by the group specified result in a cyclic order, the output data selecting means selects one group placed in the center of the rearranged groups in a case where the number of groups indicated by the group specified result is an odd number, and the output data selecting means selects one group near to a preceding selected group from two groups placed in the center of the rearranged groups in a case where the number of groups indicated by the group specified result is an even number.

5. The serial data receiving device according to claim 1, wherein the over-sampling means produces the over-sampled binary digits corresponding to the N groups of sampling operations each time the over-sampling means receives the input serial bit string of a prescribed bit length, the data dividing means produces the N divided bit strings respectively having the prescribed bit length each time the over-sampling means receives the input serial bit string of the prescribed bit length, the data retrieving means combines a plurality of divided bit strings, which are successively produced by the data dividing means and correspond to one group of sampling operation, with each other for each group of sampling operation to produces N referential word searching bit strings corresponding to the N groups of sampling operations respectively, and the data retrieving means searches each referential word searching bit string for the referential word.

6. The serial data receiving device according to claim 1, wherein the referential word is included in the input serial bit string in a referential word transmitting time period, the over-sampling means produces the over-sampled binary digits corresponding to the N groups of sampling operations each time the over-sampling means receives the input serial bit string of a prescribed bit length, the data dividing means produces the N divided bit strings respectively having the prescribed bit length each time the over-sampling means receives the input serial bit string of the prescribed bit length, the data retrieving means retrieves the string of desired data from the divided bit string for each group of sampling operations after the referential word transmitting time period each time the data dividing means produces the N divided bit strings, the output data selecting means determines the selected group as the final selected group just after the referential word transmitting time period, and the output data selecting means again determines another final selected group of a current selection in place of the final selected group of a preceding selection, each time the output data selecting means receives the N strings of desired data corresponding to the N groups of sampling operations from the data retrieving means, on condition that the final selected group of the current selection is set to the final selected group of the preceding selection in a case where no pair of strings of desired data have the same bit string of the prescribed bit length, the final selected group of the current selection is set to the final selected group of the preceding selection in a case where only two strings of desired data including the string of desired data corresponding to the final selected group of the preceding selection have the same bit string of the prescribed bit length, the final selected group of the current selection is set to a specific group in a case where only two strings of desired data not including the string of desired data corresponding to the final selected group of the preceding selection but including one string of desired data corresponding to the specific group nearer to the final selected group of the preceding selection than the other string of desired data in the cyclic arrangement of the two groups have the same bit string of the prescribed bit length, the final selected group of the current selection is set to a specific group in a case where an odd number of strings of desired data including the string of desired data corresponding to the specific group have the same bit string of the prescribed bit length and the specific group is placed in the center of an odd number of groups corresponding to the strings of desired data in the cyclic arrangement, and the final selected group of the current selection is set to a specific group in a case where an even number of strings of desired data including two strings of desired data corresponding to the specific group and an adjacent group have the same bit string of the prescribed bit length, the specific group and the adjacent group are placed in the center of an even number of groups corresponding to the strings of desired data in the cyclic arrangement, and the specific group is nearer to the final selected group of the preceding selection than the adjacent group in the cyclic arrangement.

7. The serial data receiving device according to claim 2, wherein the output data selecting means determines a word start position in each divided bit string having no referential word to a bit number by rearranging the N groups in a cyclic order so as to place the selected group in the center of the rearranged groups, obtaining the bit number by adding one to the word start position corresponding to the selected group in a case where the sampling operation for the group corresponding to the divided bit string is earlier than that for the selected group and the group corresponding to the divided bit string is placed in the rear of the selected group, obtaining the bit number by subtracting one from the word start position corresponding to the selected group in a case where the sampling operation for the group corresponding to the divided bit string is later than that for the selected group and the group corresponding to the divided bit string is placed in front of the selected group and obtaining the bit number equal to the word start position corresponding to the selected group in other cases, and the data retrieving means searches each of the N divided bit strings for the referential word by using the word start position in the divided bit string.

8. The serial data receiving device according to claim 2, wherein the referential word is included in the input serial bit string in a referential word transmitting time period, the over-sampling means produces the over-sampled binary digits corresponding to the N groups of sampling operations each time the over-sampling means receives the input serial bit string of a prescribed bit length, the data dividing means produces the N divided bit strings respectively having the prescribed bit length each time the over-sampling means receives the input serial bit string of the prescribed bit length, the output data selecting means receives the word start position corresponding to the group of each divided bit string having the referential word in the referential word transmitting time period each time the data dividing means produces the N divided bit strings, the output data selecting means determines the selected group as the final selected group just after the referential word transmitting time period, the output data selecting means determines a word start position corresponding to each remaining group other than the final selected group to a bit number after the referential word transmitting time period by rearranging the N groups in a cyclic order so as to place the final selected group in the center of the rearranged groups, obtaining the bit number by adding one to the word start position corresponding to the final selected group in a case where the sampling operation for the remaining group is earlier than that for the final selected group and the remaining group is placed in the rear of the final selected group, obtaining the bit number by subtracting one from the word start position corresponding to the final selected group in a case where the sampling operation for the remaining group is later than that for the final selected group and the remaining group is placed in front of the final selected group of the current selection, and obtaining the bit number equal to the word start position corresponding to the final selected group in other cases, the output data selecting means determines a final selected group of a current data reception in place of the final selected group of a preceding data reception after the referential word transmitting time period each time the data dividing means produces the N divided bit strings, the output data selecting means sets a word start position of the final selected group of the current data reception to the bit number set in the preceding data reception to the same group as the final selected group of the current data reception, the output data selecting means determines a word start position corresponding to each remaining group other than the final selected group in the current data reception in the same manner as the determination of the word start positions in the preceding data reception, the data retrieving means retrieves the string of desired data from the divided bit string for each group according to the word start position of the group determined by the output data selecting means after the referential word transmitting time period each time the data dividing means produces the N divided bit strings, and the output data selecting means outputs the string of desired data of the final selected group received from the data retrieving means as the output bit string each time the output data selecting means receives the N strings of desired data corresponding to the N groups of sampling operations from the data retrieving means.

* * * * *